(12) United States Patent
Liu et al.

(10) Patent No.: US 11,880,329 B2
(45) Date of Patent: Jan. 23, 2024

(54) ARBITRATION BASED MACHINE LEARNING DATA PROCESSOR

(71) Applicant: Shanghai Cambricon Information Technology Co., Ltd., Pudong New Area (CN)

(72) Inventors: Shaoli Liu, Pudong New Area (CN); Zhen Li, Pudong New Area (CN); Yao Zhang, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 0 days.

(21) Appl. No.: 17/564,431

(22) Filed: Dec. 29, 2021

(65) Prior Publication Data

US 2022/0121599 A1     Apr. 21, 2022

Related U.S. Application Data

(63) Continuation of application No. 17/278,812, filed as application No. PCT/CN2019/111977 on Oct. 18, 2019.

(30) Foreign Application Priority Data

Oct. 18, 2018   (CN) .......................... 201811215820.7
Oct. 18, 2018   (CN) .......................... 201811215978.4
(Continued)

(51) Int. Cl.
*G06F 13/40*     (2006.01)
*G06N 3/04*      (2023.01)

(52) U.S. Cl.
CPC ........... *G06F 13/4068* (2013.01); *G06N 3/04* (2013.01)

(58) Field of Classification Search
CPC .. G06F 13/4068; G06F 15/161; G06F 9/3891; G06F 9/3828; G06N 3/04
See application file for complete search history.

(56) References Cited

U.S. PATENT DOCUMENTS 11,514,291 B2 *  11/2022  Baum .................... G06N 3/045
2009/0128571 A1    5/2009  Smith et al.
(Continued)

FOREIGN PATENT DOCUMENTS

CN      101227486 A     7/2008
CN      102075578 A     5/2011
(Continued)

OTHER PUBLICATIONS

KR 10-2020-7034126—Office Action, dated Jul. 25, 2022, 13 pages.
(Continued)

*Primary Examiner* — Idriss N Alrobaye
*Assistant Examiner* — Richard B Franklin
(74) *Attorney, Agent, or Firm* — Getech Law LLC; Jun Ye

(57) ABSTRACT

The present application relates to a network-on-chip data processing method. The method is applied to a network-on-chip processing system, the network-on-chip processing system is used for executing machine learning calculation, and the network-on-chip processing system comprises a storage device and a calculation device. The method comprises: accessing the storage device in the network-on-chip processing system by means of a first calculation device in the network-on-chip processing system and obtaining first operation data; performing an operation on the first operation data by means of the first calculation device to obtain a first operation result; and sending the first operation result to a second calculation device in the network-on-chip process- (Continued)

ing system. According to the method, operation overhead can be reduced and data read/write efficiency can be improved.

16 Claims, 9 Drawing Sheets

(30) Foreign Application Priority Data

| Oct. 18, 2018 | (CN) | 201811216718.9 |
| Oct. 18, 2018 | (CN) | 201811216857.1 |
| Nov. 21, 2018 | (CN) | 201811390409.3 |
| Nov. 21, 2018 | (CN) | 201811390428.6 |
| Nov. 21, 2018 | (CN) | 201811392232.0 |
| Nov. 21, 2018 | (CN) | 201811392262.1 |
| Nov. 21, 2018 | (CN) | 201811392270.6 |
| Nov. 21, 2018 | (CN) | 201811392279.7 |
| Nov. 21, 2018 | (CN) | 201811393352.2 |

(56) References Cited

U.S. PATENT DOCUMENTS

| 2012/0303848 A1 | 11/2012 | Vallapaneni et al. |
| 2012/0303933 A1 | 11/2012 | Manet et al. |
| 2017/0083338 A1 | 3/2017 | Burger et al. |
| 2017/0147513 A1* | 5/2017 | Hilton ............... G06F 13/1663 |
| 2018/0004518 A1 | 1/2018 | Plotnikov et al. |

FOREIGN PATENT DOCUMENTS

| CN | 102591759 A | 7/2012 |
| CN | 102868644 A | 1/2013 |
| CN | 103218208 A | 7/2013 |
| CN | 103580890 A | 2/2014 |
| CN | 105183662 A | 12/2015 |
| CN | 107316078 A | 11/2017 |
| CN | 107578095 A | 1/2018 |
| CN | 107920025 A | 4/2018 |
| CN | 107992329 A | 5/2018 |
| CN | 108427990 A | 8/2018 |
| CN | 108431770 A | 8/2018 |
| CN | 108470009 A | 8/2018 |
| JP | H01179515 A | 7/1989 |
| JP | H04507027 A | 12/1992 |
| JP | H05274455 A | 10/1993 |
| JP | H09120391 A | 5/1997 |
| JP | 2738141 B2 | 4/1998 |
| JP | 2001501755 A | 2/2001 |
| JP | 2006286002 A | 10/2006 |
| JP | 2008301109 A | 12/2008 |
| JP | 2015509183 A | 3/2015 |
| JP | 2018514872 A | 6/2018 |
| KR | 100520807 B1 | 10/2005 |
| KR | 1020100044278 A | 4/2010 |
| KR | 1020100125331 A | 11/2010 |
| KR | 101306354 B1 | 9/2013 |
| KR | 1020160127100 A | 11/2016 |
| KR | 1020170125396 A | 11/2017 |
| WO | 2015087424 A1 | 6/2015 |
| WO | 2017185418 A1 | 11/2017 |
| WO | 2018103736 A1 | 6/2018 |
| WO | 2018126073 A1 | 7/2018 |

OTHER PUBLICATIONS

KR 10-2020-7034138—Office Action, dated Jul. 19, 2022, 15 pages.
CN 201811215820.7—First Office Action, dated Aug. 26, 2021, 31 pages. (with English translation).
CN 201811215978.4—First Office Action, dated Aug. 26, 2021, 32 pages. (with English translation).
CN 201811216718.9—First Office Action, datled Aug. 26, 2021, 21 pages. (with English translation).
CN 201811390409.—First Office Action, dated Feb. 20, 2021, 10 pages. (with English translation).
CN 201811392232.0—First Office Action, dated Feb. 10, 2021, 11 pages. (with English translation).
CN 201811392270.6—First Office Action, dated Aug. 18, 2021, 12 pages. (with English translation).
JP 2020206272—Notice of Reasons for Refusal, dated Nov. 24, 2021, 7 pages. (with English translation).
JP 2020206281—Notice of Reasons for Refusal, dated Dec. 9, 2021, 8 pages. (with English translation).
JP 2020206293—Notice of Reasons for Refusal, dated Dec. 9, 2021, 8 pages. (with English translation).
JP 2020206306—Notice of Reasons for Refusal, dated Dec. 9, 2021, 8 pages. (with English translation).
JP 2020569113—Notice of Reasons for Refusal, dated Nov. 24, 2021, 7 pages. (with English translation).
EP 19873122.6—Extended European Search Report, dated May 20, 2022, 13 pages.
EP 21217802.4—Extended European Search Report, dated May 3, 2022, 11 pages.
EP 21217809.9—Extended European Search Report, dated May 10, 2022, 11 pages.
EP 21217811.5—Extended European Search Report, dated May 9, 2022, 11 pages.
KR 10-2020-7034133—Notification of Reason for Refusal, dated Jul. 14, 2022, 11 pages.
CN 201911058910.4—Second Office Action, dated Jul. 4, 2022, 6 pages. (With brief English Explanation).
CN201811216857.1—Chinese Office Action dated Jan. 3, 2023, 22 pages. (With Brief English Explanation).
Ebrahimi et al., "Cluster-based topologies for 3D Networks-on-Chip using advanced inter-layer bus architecture", Journal of Computer and System Sciences, vol. 79, Issue 4, Jun. 2013, pp. 475-491.
PCT /CN2019/111977—International Search Report and Written Opinion dated Jan. 22, 2020, 13 pages.
KR 10-2020-7034145—Office Action, dated Jul. 25, 2022, 9 pages. (With brief English explanation).
CN201811216857.1—Second Office Action dated Jun. 1, 2023, 19 pages. (With Brief English Explanation).
KR20207034126—Written Decision on Registration dated May 8, 2023, 6 pages.
KR20207034133—Written Decision on Registration dated May 8, 2023, 6 pages.
KR20207034138—Written Decision on Registration dated May 8, 2023, 6 pages.
KR20207034145—Written Decision on Registration dated May 8, 2023, 6 pages.

* cited by examiner

ARBITRATION BASED MACHINE LEARNING DATA PROCESSOR

CROSS REFERENCES

This application is a continuation of U.S. patent application Ser. No. 17/278,812, filed Mar. 23, 2021, which is a 371 of International Application PCT/CN2019/111977, filed Oct. 18, 2019, which claims the benefit of priority from Chinese Application No. 201811216718.9 with the title of "Network-On-Chip Processing System and Network-On-Chip Data Processing Method", Chinese Application No. 201811215820.7 with the title of "Network-On-Chip Processing System and Network-On-Chip Data Processing Method", Chinese Application No. 201811215978.4 with the title of "Network-on-Chip Processing System and Network-on-Chip Data Processing Method", and Chinese Application No. 201811216857.1 with the title of "Network-on-Chip Data Processing Method, Storage Medium, Computer Equipment and Device", all of which were filed on Oct. 18, 2018; this application also claims the benefit of priority from Chinese Application No. 201811392232.0 with the title of "Data Processing Method, Device, and Related Product", Chinese Application No. 201811392262.1 with the title of "Data Processing Method, Device, and Related Product", Chinese Application No. 201811392279.7 with the title of "Data Processing Device, Method, and Related Product", Chinese Application No. 201811393352.2 with the title of "Data Processing Device, Method, and Related Product", Chinese Application No. 201811390409.3 with the title of "Data Processing Device, Method, and Related Product", Chinese Application No. 201811390428.6 with the title of "Data Processing Device and Related Product", and Chinese Application No. 201811392270.6 with the title of "Data Processing Device and Related Product", all of which were filed on Nov. 21, 2018. The disclosures of the above applications are incorporated herein by reference in their entirety.

TECHNICAL FIELD

The present disclosure relates to the field of information processing technology, and particularly relates to a network-on-chip data processing method and device.

BACKGROUND

With the development of semi-conductor technology, it has become a reality to integrate hundreds of millions of transistors on a single chip. The network-on-chip (NoC) is capable of integrating plenty of computation resources on a single chip and implementing on-chip communication.

As plenty of computations are required in a neural network, some of the computations, such as a forward operation, a backward operation, and weight update, need to be processed in parallel. In a chip architecture with a large number of transistors, chip design may face problems such as high memory access overhead, high bandwidth blockage, and low data reading/writing efficiency.

SUMMARY

In order to at least overcome the problems existing in the related technology to a certain extent, the present disclosure provides an interaction method, a device, and a smart terminal.

An embodiment of the present disclosure provides a network-on-chip (NoC) processing system. The system includes: a storage device and a plurality of computation devices, where the storage device and the plurality of computation devices are arranged on a same chip. At least one computation device is connected to the storage device, and at least two computation devices are connected to each other.

In an embodiment, any two of the plurality of computation devices are directly connected to each other.

In an embodiment, the plurality of computation devices include a first computation device and a plurality of second computation devices, where the first computation device is connected to the storage device, and at least one of the plurality of second computation devices is connected to the first computation device.

In an embodiment, at least two of the plurality of second computation devices are connected to each other, and are connected to the storage device through the first computation device.

In an embodiment, any two of the plurality of second computation devices are directly connected to the first computation device.

In an embodiment, each of the plurality of computation devices is connected to the storage device, and at least two computation devices are connected to each other.

An embodiment of the present disclosure provides a data processing device configured to process machine learning data. The data processing device includes a machine learning device, a transmission circuit, and a shared memory. The transmission circuit includes a plurality of read/write processing circuits and an arbitration circuit, the machine learning device includes a plurality of machine learning units, where each of the machine learning units includes at least one operation unit, the plurality of machine learning units are connected to the transmission circuit through a first transmission interface, the transmission circuit is connected to the shared memory;

the arbitration circuit is configured to arbitrate data operation signals sent by the plurality of machine learning units, and obtain input data required by the machine learning device from the shared memory according to data operation signals that have been successfully arbitrated; and the read/write processing circuit is configured to determine a target machine learning unit or a target operation unit from the plurality of machine learning units according to address information carried by the data operation signals that have been successfully arbitrated or types of the data operation signals, and return the input data to the target machine learning unit or the target operation unit.

In an embodiment, the arbitration circuit is specifically configured to determine priorities of data operation signals sent by the plurality of read/write processing circuits, and use a data operation signal with a highest priority as a data operation signal that has been successfully arbitrated.

In an embodiment, the arbitration circuit is specifically configured to, when priorities of the data operation signals sent by the plurality of read/write processing circuits are identical, determine a data operation signal that has been successfully arbitrated according to the types of the plurality of data operation signals and a preset execution condition.

In an embodiment, if the data operation signal is a unicast-type signal, the execution condition includes: a channel of a machine learning unit that sends the unicast-type signal is idle, or a channel of an operation unit in the machine learning unit that sends the unicast-type signal is idle.

In an embodiment, if the data operation signal is a multicast-type signal, the execution condition includes: a channel of a machine learning unit that sends the multicast-type signal is idle, and a channel of a target machine learning unit specified by the multicast-type signal is idle; or, a channel of an operation unit in the machine learning unit that sends the multicast-type signal is idle, and a channel of a target operation unit specified by the multicast-type signal is idle.

In an embodiment, if the data operation signal is a broadcast-type signal, the execution condition includes: a channel of a machine learning unit that sends the broadcast-type signal is idle, and channels of other remaining machine learning units are idle; or, a channel of an operation unit in the machine learning unit that sends the broadcast-type signal is idle, and channels of operation units in other remaining machine learning units are idle.

In an embodiment, the transmission circuit further includes a second transmission interface, where each interface in the second transmission interface is connected to each interface in the first transmission interface in a one-to-one correspondence, and one machine learning unit is correspondingly connected to one read/write processing circuit.

In an embodiment, a plurality of operation units in one machine learning unit share a same sending interface in the first transmission interface, and each operation unit corresponds to one data receiving interface.

In an embodiment, each of the plurality of operation units in one machine learning unit respectively corresponds to one sending interface and one data receiving interface in the first transmission interface.

In an embodiment, the transmission circuit further includes a second transmission interface, and the plurality of machine learning units share a signal receiving interface and a data return interface in the second transmission interface.

In an embodiment, the read/write processing circuit further includes a signal queue, where the signal queue is used to store data operation signals sent by each machine learning unit;
the read/write processing circuit is further configured to determine whether there is remaining space in the request queue when receiving the data operation signals; if there is remaining space, the read/write processing circuit is configured to cache the data operation signals in the request queue; otherwise the read/write processing circuit is configured to block the data operation signals.

In an embodiment, if the read/write processing circuit is a broadcast processing circuit, the signal queue includes an instruction queue and a request queue, where
the instruction queue is used to cache instruction-type signals received by the broadcast processing circuit; and
the request queue is used to cache request-type signals obtained after parsing the instruction-type signals.

In an embodiment, the machine learning unit further includes: a controller unit connected to the operation unit; the operation unit includes a primary processing circuit and a plurality of secondary processing circuits, and the operation unit is connected to the transmission circuit through the first transmission circuit;
the controller unit is configured to send the data operation signal and the output data to the transmission circuit through the transmission interface in the first transmission interface, receive the input neuron data and the weight data obtained from the shared memory through the receiving interface in the first transmission interface, and send the input neuron data and the weight data to the primary processing circuit and/or the secondary processing circuits;
the primary processing circuit is configured to distribute the input data to the plurality of secondary processing circuits; the plurality of secondary processing circuits are configured to perform intermediate operations in parallel according to neuron data and weight data transferred by the primary processing circuit to obtain a plurality of intermediate results, and transfer the plurality of intermediate results to the primary processing circuit; and
the primary processing circuit is further configured to perform subsequent processing on the plurality of intermediate results to obtain a computation result.

In an embodiment, the input data includes input neuron data and/or weight data; and the output data includes output neuron data.

An embodiment of the present disclosure provides a neural network operation device, where the operation device includes one or more computation devices in the Noc processing system. The neural network operation device is configured to obtain data to be operated and control information from other processing devices, execute a specified machine learning operation, and transfer an execution result to other processing devices through an I/O interface.

When the neural network operation device includes a plurality of the computation devices, the plurality of computation devices may be interconnected and transfer data to each other through a specific structure, where
the plurality of computation devices are interconnected and transfer data to each other through a PCIE bus to support a larger-scale machine learning operation; the plurality of computation devices share a same control system or have respective control systems; the plurality of computation devices share a memory or have respective memories; and an interconnection mode of the plurality of computation devices is any interconnection topology.

An embodiment of the present disclosure provides a combined processing device, where the combined processing device includes the neural network operation device, a universal interconnection interface, and other processing devices. The neural network operation device interacts with the other processing devices to jointly complete operations specified by a user. The combined processing device may also include a storage device, where the storage device is connected to the neural network operation device and the other processing devices respectively, and the storage device is configured to store data of the neural network computation device and the other processing devices.

An embodiment of the present disclosure provides a neural network chip, where the chip includes the computation device in the NoC processing system, the neural network computation device, or the combined processing device.

An embodiment of the present disclosure provides a neural network chip package structure, where the package structure includes the neural network chip.

An embodiment of the present disclosure provides a board card, where the board card includes the neural network chip package structure.

An embodiment of the present disclosure provides an electronic device, where the electronic device includes the neural network chip or the board card.

It should be understood that the above general descriptions and the following detailed descriptions are only exemplary and illustrative, and are not intended to limit the present disclosure.

BRIEF DESCRIPTION OF THE DRAWINGS

The accompanied drawings herein are incorporated into the specification and constitute a part of the specification, illustrate embodiments that conform to the present disclosure, and are used together with the specification to explain principles of the present disclosure.

DETAILED DESCRIPTION OF THE EMBODIMENTS

The exemplary embodiments will be described in detail, and examples thereof are shown in the accompanied drawings. Unless otherwise indicated, identical numbers in different drawings indicate identical or similar elements. The implementation manners described in the following exemplary embodiments do not represent all implementation manners consistent with the present disclosure. On the contrary, the implementation manners are only examples of devices and methods which are consistent with some aspects of the present disclosure and specifically described in the appended claims.

With continuous development of artificial neural networks, machine learning chips with more architectures gradually come out. Due to the large amount of data required by the machine learning chips and high speed requirements of the machine learning chips for data processing, when the machine learning chips access or process data in the memory, in the process of data access or operation, the bandwidth of data transmission is usually increased by increasing the amount of hardware, thereby accelerating data processing to meet the high speed requirements of the machine learning chips for data processing.

However, when the machine learning chip performs data access or operation, high hardware overhead and hardware redundancy may be caused by using the above method.

Figure 1:
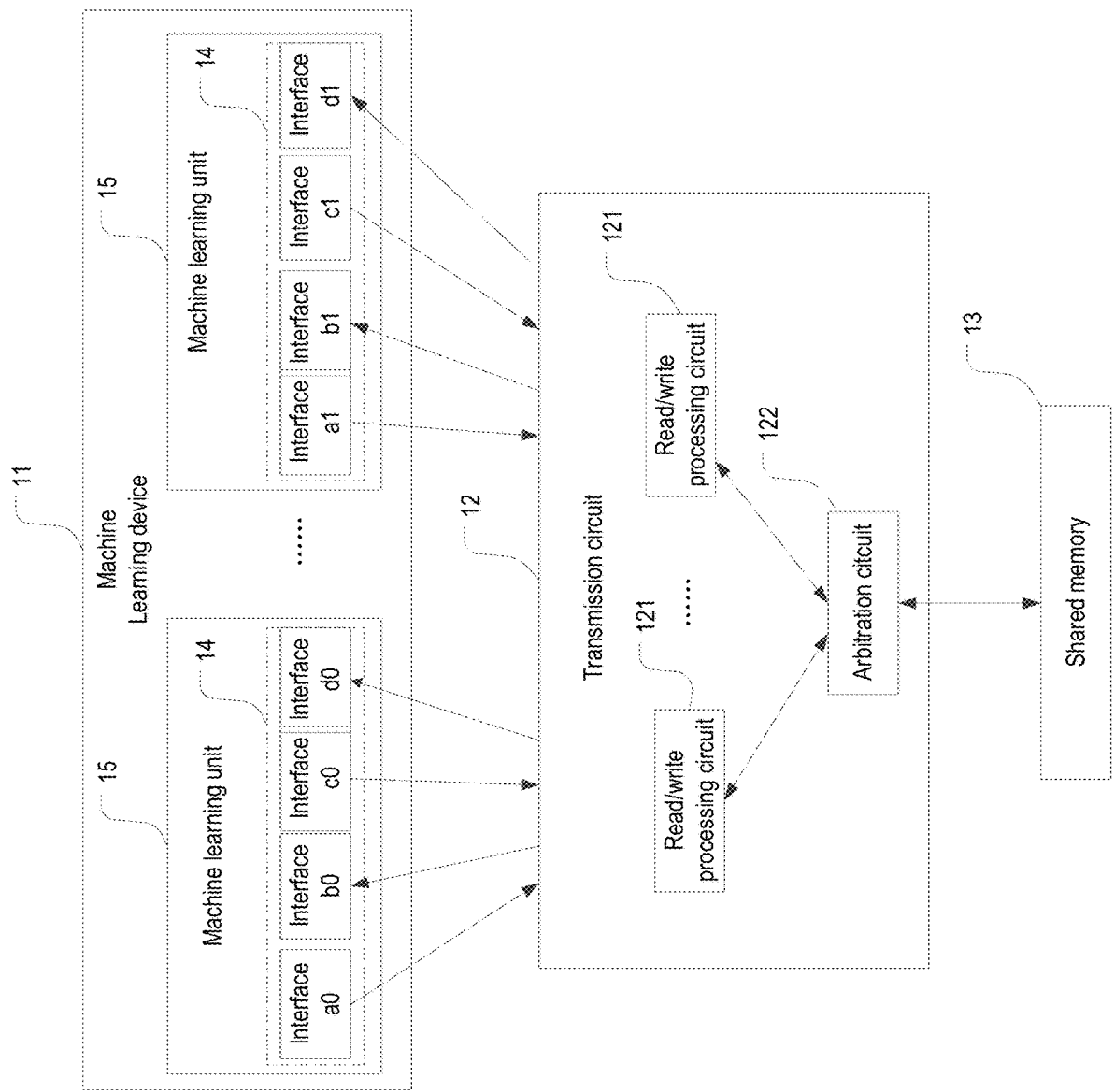
FIG. 1 is a schematic structural diagram of a data processing device according to an embodiment.

To solve the above problem, the present disclosure provides the following technical solutions:

A data processing device provided in an embodiment of the present disclosure may be implemented by software, hardware, or a combination of software and hardware, and may be part or all of the data processing device shown in FIG. 1. The data processing device is configured to process machine learning data and may include a machine learning device 11, a transmission circuit 12, and a shared memory 13. The transmission circuit 12 includes a plurality of read/write processing circuits 121 and an arbitration circuit 122, where the arbitration circuit 122 is configured to arbitrate data operation signals sent by the plurality of machine learning units 15 and obtain input data required by the machine learning device 11 from the shared memory 13 according to the data operation signals that have been successfully arbitrated; the read/write processing circuit 121 is configured to determine a target machine learning unit or a target operation unit from the plurality of machine learning units according to address information carried by the successfully arbitrated data operation signals or types of the data operation signals, and return the input data to the target machine learning unit or the target operation unit. The machine learning device 11 includes a plurality of machine learning units 15, where each of the machine learning units 15 includes at least one operation unit 151, the plurality of machine learning units are connected to the transmission circuit 12 through a first transmission interface 14, and the transmission circuit 12 is connected to the shared memory 13.

Optionally, the machine learning device 11 is configured to perform a machine learning operation according to the input data to obtain output data. Optionally, the machine learning device 11 is further configured to transfer the output data to the shared memory 13 through the transmission circuit 12 for data storage. Specifically, when the machine learning device 11 is configured to perform a neural network operation, the device 11 may perform an artificial neural network operation according to input neuron data and weight data to obtain output neuron data, use the output neuron data as new input neuron data, and transfer the new input neuron data to the shared memory 13 through the transmission circuit 12 for data storage.

It should be noted that the above machine learning unit, the transmission circuit, the shared memory, and various types of interfaces may all be implemented by hardware circuits. For example, the transmission circuit may be a broadcast bus, the shared memory may be a non-volatile and/or volatile memory, including but not limited to a random access memory (RAM), a scratchpad memory, and the like, and the various types of interfaces may correspond to one or more data I/O interfaces or I/O pins.

Referring to FIG. 1, in an implementation, the above machine learning device 11 may include a plurality of machine learning units 15. For a multi-layer neural network operation, an operation of a certain layer of neural network in a forward operation is described below as an example. In an embodiment, the above machine learning device may perform a computation in parallel on output neuron data of all neurons in the layer of the neural network through a plurality of machine learning units (MLU). For example, if the machine learning device includes 4 machine learning units and the layer of neural network has 100 neurons, 25 neurons may be assigned to each machine learning unit for processing by setting a corresponding operation instruction; in this process, each machine learning unit may obtain input neuron data and weight data corresponding to the 25 assigned neurons of the layer from the shared memory through the transmission circuit, perform an operation to obtain output neuron data of the 25 assigned neurons of the layer, and then transfer the output neuron data of the 25 assigned neurons of the layer to the shared memory through the transmission circuit for storage. It can be understood that each of the above machine learning units may process a plurality of assigned neuron data of the layer by parallel computations. The above computation manner of performing a neural network computation in parallel layer by layer may realize parallel processing of neural network computation, which improves the processing efficiency.

When a plurality of machine learning units 15 simultaneously send data operation signals to the transmission circuit 12 through the first transmission interface 14, the units may send data operation signals to the read/write processing circuit 121 through the first transmission interface 14. The read/write processing circuit 121 may be one or more read/write processing circuits. When the read/write processing circuit 121 includes a plurality of read/write processing circuits, one machine learning unit 15 may correspond to one or a plurality of read/write processing circuits. The read/write processing circuit 121 is configured to send the data operation signals to the arbitration circuit 122, and the arbitration circuit 122 is configured to arbitrate the plurality of data operation signals, and obtain input neuron data and weight data required by the machine learning units corresponding to the data operation signals from the shared memory 13 according to the data operation signals that have been successfully arbitrated. The read/write processing circuit 121 may be configured to determine a target machine learning unit or a target operation unit according to address information carried by the data operation signals that have been successfully arbitrated or types of the data operation signals, and return input neuron data and weight data to the target machine learning unit or the target operation unit.

For example, when the machine learning device includes 4 machine learning units, namely a machine learning unit 0, a machine learning unit 1, a machine learning unit 2, and a machine learning unit 3, the 4 machine learning units correspond to 4 read/write processing circuits, namely a read/write processing circuit 0, a read/write processing circuit 1, a read/write processing circuit 2, and a read/write processing circuit 3. The machine learning unit 0, the machine learning unit 1, the machine learning unit 2, and the machine learning unit 3 respectively send data operation signals to the reading/writing processing circuit 0, the reading/writing processing circuit 1, the reading/writing processing circuit 2, and the reading/writing processing circuit 3 through the first transmission interface 14, which may specifically include: sending a data operation signal 0 to the read/write processing circuit 0, sending a data operation signal 1 to the read/write processing circuit 1, sending a data operation signal 2 to the read/write processing circuit 2, and sending a data operation signal 3 to the read/write processing circuit 3. The read/write processing circuit 0, the read/write processing circuit 1, the read/write processing circuit 2, and the read/write processing circuit 3 respectively send the data operation signal 0, the data operation signal 1, the data operation signal 2, and the data operation signal 3 to the arbitration circuit 122 for arbitration. The arbitration circuit 122 performs arbitration on the plurality of data operation signals, determines the data operation signal 2 to be a data operation signal that has been successfully arbitrated, and obtains input neuron data and weight data from the shared memory 13 according to the data operation signal 2; the read/write processing circuit 2 determines a target machine learning unit to be a machine learning unit 1 and a machine learning unit 2 according to address information carried in the data operation signal 2, where the address information includes addresses of the machine learning unit 1 and the machine learning unit 2, and then the read/write processing circuit 2 returns the input neuron data and the weight data obtained according to the data operation signal 2 to the machine learning unit 1 and the machine learning unit 2.

In another embodiment, the above machine learning device may perform a computation on output neuron data of all neurons in each layer of the neural network respectively in a certain order through a plurality of machine learning units. In this process, a previous machine learning unit can transfer the output neuron data of all neurons of this layer to the shared memory through the transmission circuit for storage, so that a next machine learning unit can fetch and use the output neuron data of all neurons of the layer as input neuron data of the next layer for computation. It may be understood that the above application is suitable for a scenario where a neural network computation amount of each layer is not large, such as a computation of a neural network with a small amount of neurons of each layer.

Figure 2:
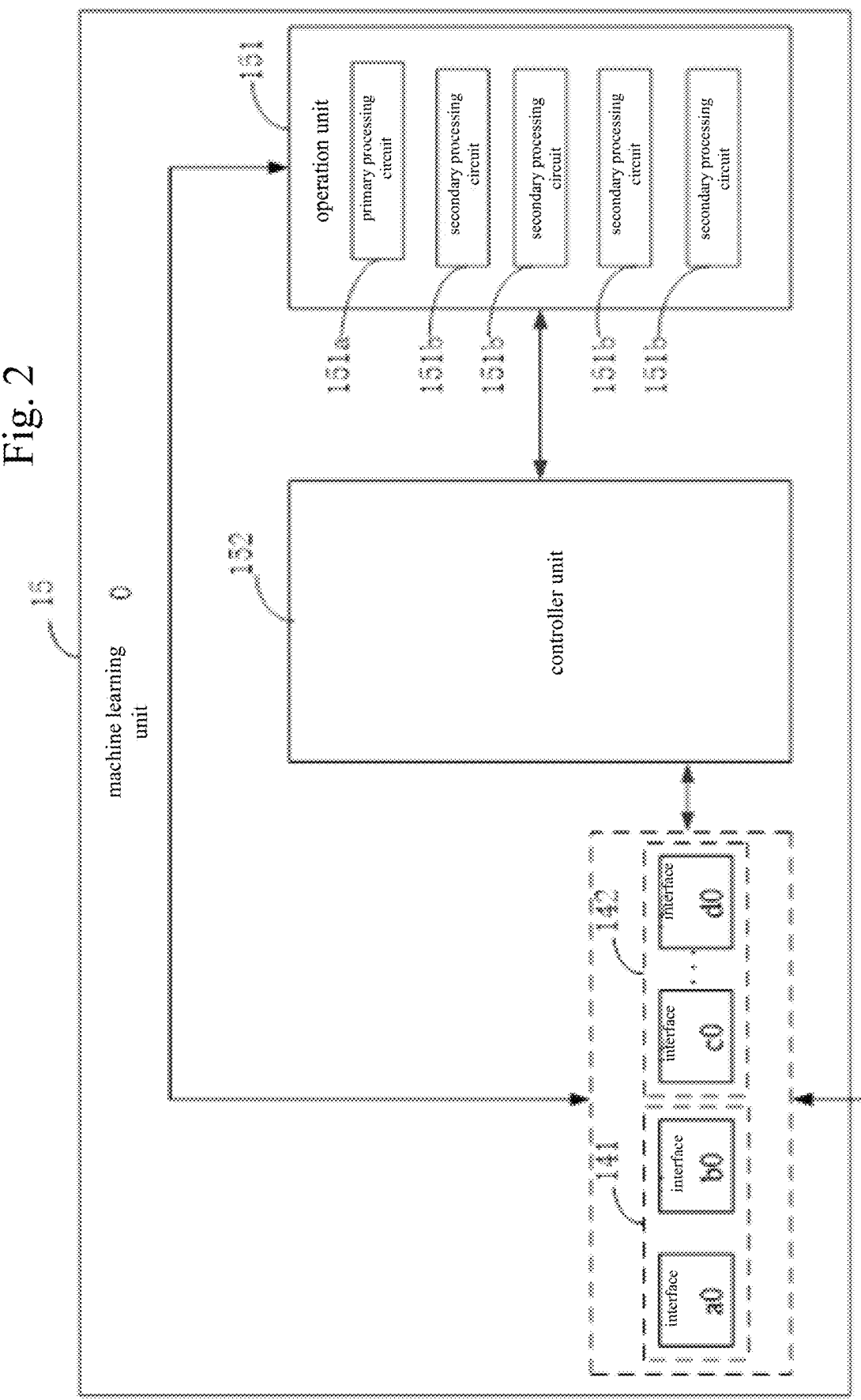
FIG. 2 is a schematic structural diagram of a machine learning unit according to an embodiment.

Referring to FIG. 2, the machine learning unit 15 will be specifically described below. In an embodiment, the machine learning unit 15 may include: at least one operation unit 151, and a controller unit 152 connected to the operation unit 151; the operation unit 151 may include a primary processing circuit 151a and a plurality of secondary processing circuits 151b, where the operation unit 151 is connected to the transmission circuit 12 through a first transmission interface 14.

The controller unit 152 is configured to send a data operation signal and output neuron data to the transmission circuit 12 through the first transmission interface 14, receive input neuron data and weight data obtained by the transmission circuit 12 from the shared memory 13 through the first transmission interface 14, and transfer the input neuron data and the weight data to the primary processing circuit 151a and/or the secondary processing circuits 151b.

The primary processing circuit 151a is configured to distribute the input neuron data and the weight data to the plurality of secondary processing circuits 151b; the plurality of secondary processing circuits 151b are configured to perform intermediate operations in parallel according to neuron data and weight data to obtain a plurality of intermediate results, and send the plurality of intermediate results to the primary processing circuit 151a; and the primary processing circuit 151a is further configured to perform subsequent processing on the plurality of intermediate results to obtain a computation result, where the subsequent processing includes an activation operation. Specifically, the controller unit 152 may obtain a computation instruction, parse the computation instruction to obtain a plurality of operation instructions, and send the plurality of operation instructions to the primary processing circuit.

It may be understood that, in this embodiment, the machine learning unit includes a plurality of operation units, and each operation unit may send or receive data through the first transmission interface.

For example, in an optional embodiment, the primary processing circuit may further include a controller unit, where the controller unit may include a primary instruction processing unit configured to decode an operation instruction into a micro-instruction. In another optional embodiment, the secondary processing circuit may also include a controller unit, where the controller unit may include a secondary instruction processing unit configured to receive and process a micro-instruction. The above micro-instruction may be a next-level instruction of the instruction. The micro-instruction may be obtained by splitting or decoding the instruction, and may be further decoded into a control signal for various components, units, or processing circuits. For example, a product micro-instruction is a next level instruction of a convolution instruction.

The data processing device configured to process machine learning data provided in the present disclosure includes a machine learning device, a transmission circuit, and a shared memory. The transmission circuit includes a plurality of read/write processing circuits and an arbitration circuit, the machine learning device includes a plurality of machine learning units, where each of the machine learning units includes at least one operation unit, the plurality of machine learning units are connected to the transmission circuit through a first transmission interface, the transmission circuit is connected to the shared memory. In this embodiment, the data processing device performs arbitration on the data operation signals sent by a plurality of machine learning units through the arbitration circuit, and obtains input neuron data and weight data required by the machine learning device from the shared memory according to the arbitration result. In this way, when the data processing device performs a data operation, the plurality of machine learning units may perform the data operation on the shared memory through a transmission circuit, and performs arbitration on the plurality of data operation signals through the arbitration circuit, which reduces hardware overhead and avoid blockage of a plurality of data operation signals.

In an embodiment, as shown in FIG. 1, the read/write processing circuit includes at least one of the following processing circuits: a unicast read processing circuit, and a broadcast processing circuit; the data operation signal includes at least one of the following: a unicast read request, a unicast write request, a multicast instruction, and a broadcast instruction, where a unicast-type processing circuit is configured to process a unicast-type signal, and a broadcast-type processing circuit is configured to process a multicast-type or broadcast-type signal.

For example, a unicast read instruction is a read instruction sent by a certain machine learning unit to read input neuron data and weight data in the source address of the shared memory, and input neuron data and weight data may be returned to the machine learning unit through the unicast read instruction, where the input neuron data and the weight data are required by the assigned neuron during a process of the machine learning unit performing a computation on assigned neurons of a certain layer according to a computation instruction. A broadcast instruction is a read instruction sent by a machine learning unit to read input neuron data and weight data in the source address of the shared memory, and the input neuron data and the weight data may be returned to all the machine learning units in the above machine learning device through the broadcast instruction, where the input neuron data may be required by all neurons of a certain layer (all output neuron data of a previous layer) and the weight data may be multiplexed weight data such as a convolution kernel. A difference between a multicast instruction and a broadcast instruction is that data return objects of the multicast instruction are a plurality of machine learning units corresponding to a flag field in the multicast instruction instead of all machine learning units in the above machine learning device. In addition, generally a difference between an instruction and a request is that an instruction has relatively large execution overhead, but include more information, while a request has relatively small execution overhead, but include less information.

In this embodiment, the data processing device performs arbitration on the data operation signals sent by a plurality of machine learning units through the arbitration circuit, and obtains input neuron data and weight data required by the machine learning device from the shared memory according to the arbitration result. In this way, when the data processing device performs a data operation, the plurality of machine learning units may perform the data operation on the shared memory through a transmission circuit, which reduces hardware overhead and avoid hardware redundancy. A specific process of how an arbitration module determines priorities of data operation signals sent by a plurality of read/write processing circuits will be described in detail through the following embodiments.

In an embodiment, the arbitration circuit 122 is specifically configured to determine priorities of data operation signals sent by the plurality of read/write processing circuits 121, and use a data operation signal with a highest priority as a data operation signal that has been successfully arbitrated.

The arbitration circuit 122 may determine priorities of a plurality of data operation signals according to a preset rule, so that the arbitration circuit 122 may determine objects to be operated (data operation signals that have been successfully arbitrated) according to the priority of each data operation signal. The arbitration circuit may perform arbitration according to the time when each data operation signal is sent or according to transmission rate information carried in each data operation signal. For example, if the time when the read/write processing circuit 1 sends the data operation signal is T and the time when the read/write processing circuit 2 sends the data operation signal is T+1, the time when the data operation signal is sent is used as a basis for arbitration to obtain data operation signals with high priorities (data operation signals which have been successfully arbitrated) sent by the read/write processing circuit 1. The arbitration circuit 122 obtains data from the shared memory 13 according to the arbitration result and the successfully arbitrated data operation signals sent by the read/write processing circuit 1.

The data processing device in this embodiment determines priorities of data operation signals sent by the plurality of read/write processing circuits through the arbitrated circuit, and uses a data operation signal with a highest priority as a data operation signal that has been successfully arbitrated. When the arbitration circuit simultaneously receive a plurality of data operation signals, the arbitration circuit determines a data operation signal that can be executed, which avoids data blockage caused by simultaneously executing a plurality of data operation signals. In this way, a plurality of machine learning units can perform a data operation on the shared memory, which reduces hardware overhead and avoids hardware redundancy.

In an embodiment, the arbitration circuit 122 is specifically configured to, when priorities of the data operation signals sent by the plurality of read/write processing circuits 121 are identical, determine a data operation signal that has been successfully arbitrated according to the types of the plurality of data operation signals and a preset execution condition.

On the basis of the above embodiment, when priorities of the data operation signals sent by the plurality of read/write processing circuits 121 are identical, the arbitration circuit 122 may determine a data operation signal that has been successfully arbitrated according to the types of the plurality of data operation signals and a preset execution condition. The preset execution condition may be determining an arbitration result by detecting whether a data transfer channel corresponding to the data operation signal is idle; if the data transfer channel is idle, the data operation signal corresponding to the data transfer channel is arbitrated to be a data operation signal that has been successfully arbitrated. The condition may also be determining an arbitration result according to the sending time information carried in the data operation signal. For example, if the arbitration circuit 122 receives 4 data operation signals including a data operation signal 0, a data operation signal 1 (a unicast read instruction), a data operation signal 2 (a broadcast instruction), and a data operation signal 3, where priorities of the data operation signal 1 and data operation signal 2 are identical, then the machine learning unit 1 is determined to be a target machine learning unit according to address information carried in the data operation signal 1, and the machine learning unit 0, the machine learning unit 1, machine learning unit 2, and the machine learning unit 3 are determined to be target machine learning units according to the type of the data operation signal 2. At this time, data channels of the machine learning unit 0, the machine learning unit 1, and the machine learning unit 2 are idle, while the data channel of the machine learning unit 3 is busy, then the arbitration circuit 122 determines the data operation signal that has been successfully arbitrated to be the data operation signal 1 according to the conditions where the data operation signal 1 is a unicast read instruction, the data operation signal 2 is a broadcast instruction, and the data channel of the machine learning unit 3 is busy.

Optionally, if the data operation signal is a unicast-type signal, the execution condition includes: a channel of a machine learning unit that sends the unicast-type signal is idle, or a channel of an operation unit in the machine learning unit that sends the unicast-type signal is idle.

Optionally, if the data operation signal is a multicast-type signal, the execution condition includes: a channel of a machine learning unit that sends the multicast-type signal is idle, and a channel of a target machine learning unit specified by the multicast-type signal is idle; or, a channel of an operation unit in the machine learning unit that sends the multicast-type signal is idle, and a channel of a target operation unit specified by the multicast-type signal is idle.

Optionally, if the data operation signal is a broadcast-type signal, the execution condition includes: a channel of a machine learning unit that sends the broadcast-type signal is idle, and channels of other remaining machine learning units are idle; or, a channel of an operation unit in the machine learning unit that sends the broadcast-type signal is idle, and channels of operation units in other remaining machine learning units are idle.

In the data processing device shown in this embodiment, when priorities of the data operation signals sent by the plurality of read/write processing circuits are identical, the arbitration circuit may determine a data operation signal that has been successfully arbitrated according to the types of the plurality of data operation signals and a preset execution condition. In this embodiment, when the priorities of the data operation signals re identical, data operation signals that have been successfully arbitrated may be determined according to the types of the data operation signals and a preset execution condition, which further avoids data blockage caused by simultaneously executing a plurality of data operation signals. In this way, a plurality of machine learning units can perform a data operation on the shared memory, which reduces hardware overhead and avoids hardware redundancy.

Figure 3:
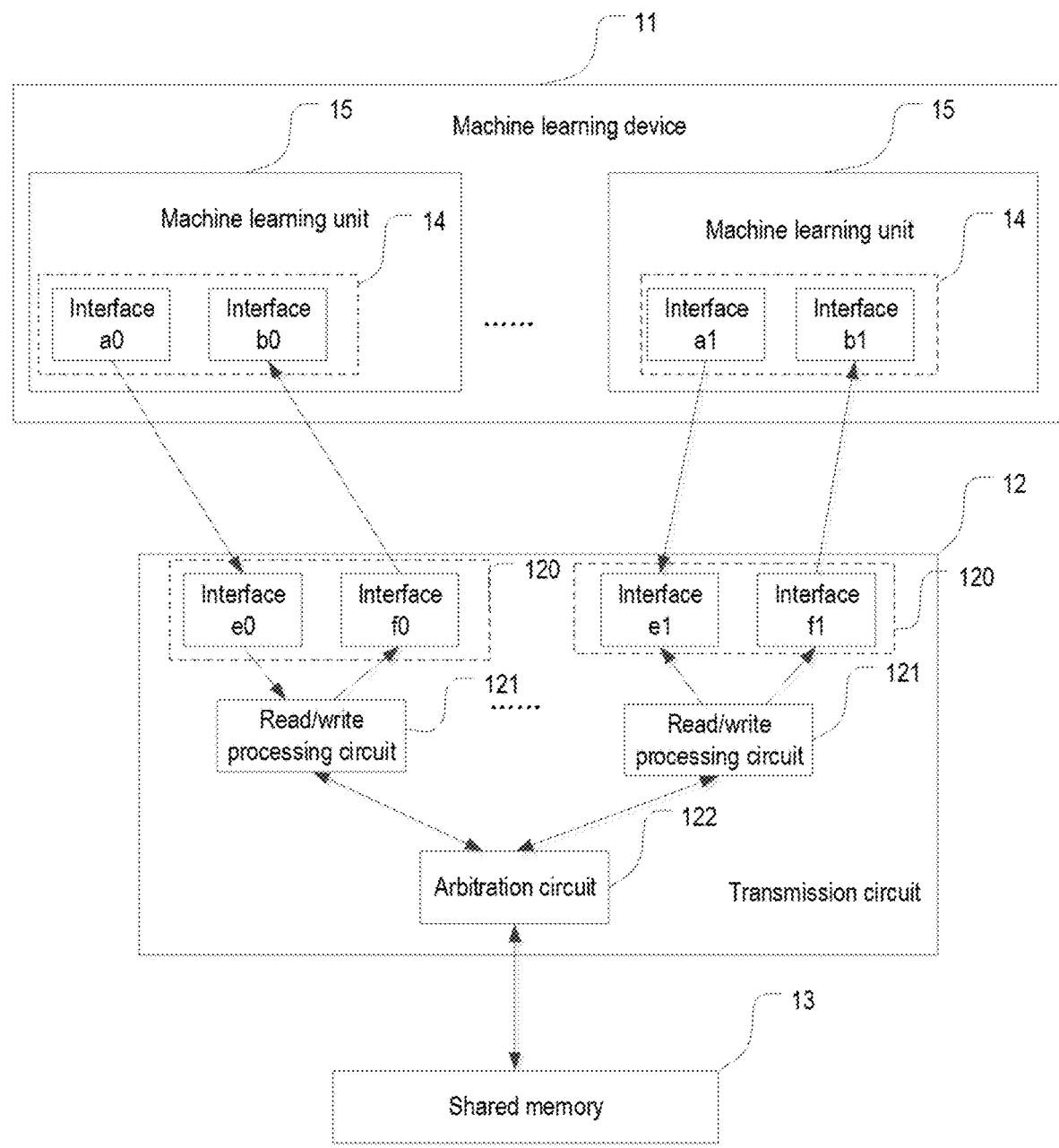
FIG. 3 is a schematic structural diagram of a data processing device according to an embodiment.

In an embodiment, as shown in FIG. 3, the transmission circuit 12 further includes a second transmission interface 120, each interface in the second transmission interface 120 is connected to each interface in the first transmission interface 14 in a one-to-one correspondence, and one machine learning unit 15 is correspondingly connected to one read/write processing circuit 121.

The first transmission interface 14 may send a data operation signal to a corresponding read/write processing circuit 121 through the second transmission interface 120, and the transmission circuit 12 may return input neuron data and weight data required by the machine learning device through the second transmission interface 120 to the first transmission interface 14, and then return the above data to a target machine learning unit or a target operation unit through the first transmission interface 14. The first transmission interface 14 and the second transmission interface 120 may include one or more interfaces. For example, if the first transmission interface 14 includes a transmission interface 141 and a data receiving interface 142, the second transmission interface 120 includes a second reception interface 1201 and a second return interface 1202 corresponding to a sending interface 141 and a return interface 142.

Figure 4:
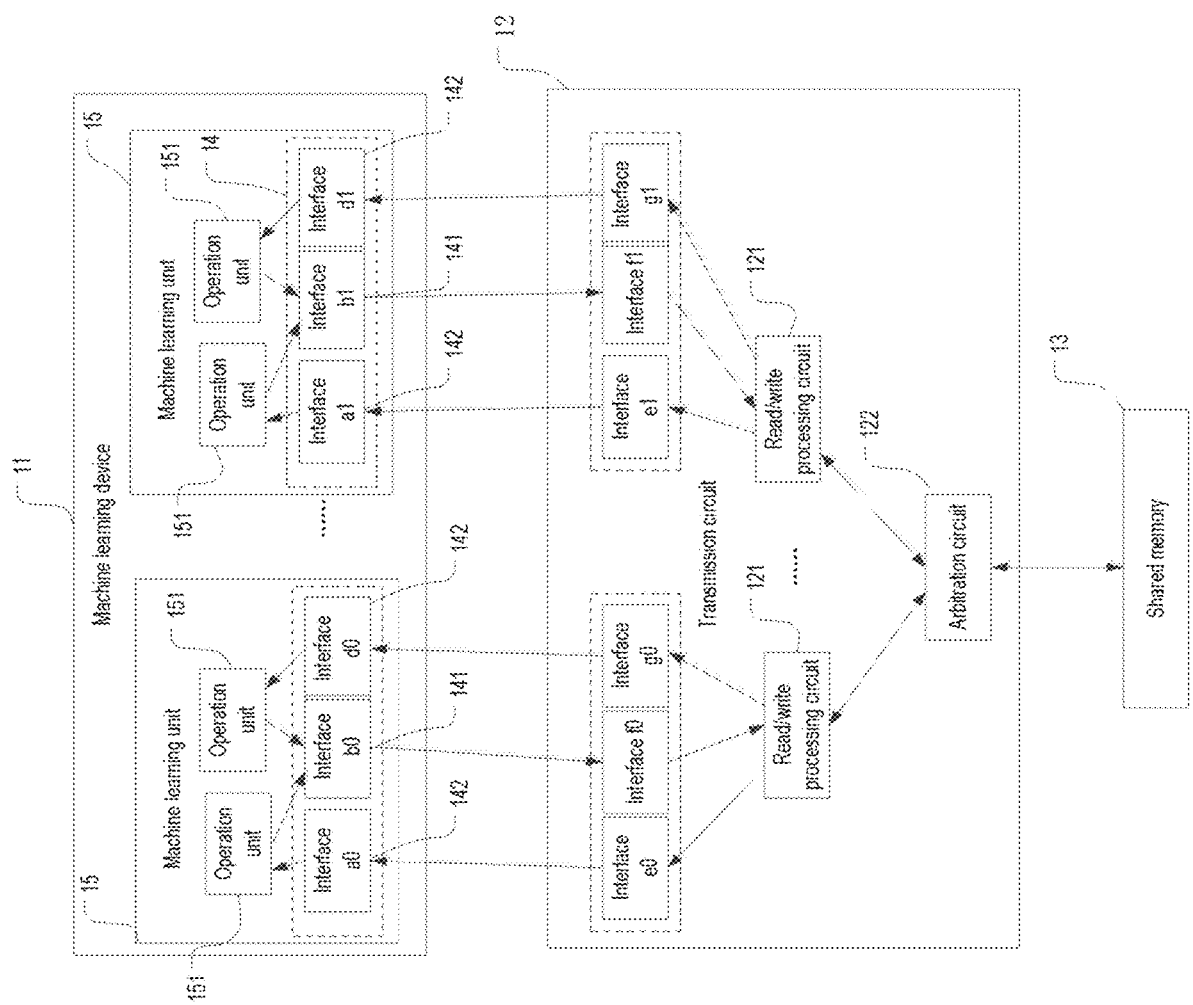
FIG. 4 is a schematic structural diagram of a data processing device according to an embodiment.

Optionally, as shown in FIG. 4, a plurality of operation units in one machine learning unit 15 share a same sending interface 141 in the first transmission interface 14, and each operation unit corresponds to one data receiving interface 142.

When one machine learning unit 15 includes a plurality of operation units 151, the plurality of operation units 151 may share one sending interface 141 of the first transmission interface 14, and the plurality of operation units 151 in one machine learning unit 15 sends a data operation signal to the transmission circuit 12 through a shared sending interface 141, and the transmission circuit 12 returns obtained input neuron data and weight data to a target operation unit through the data receiving interface 142 corresponding to the target operation unit 151.

Therefore, in the data processing device shown in this embodiment, a plurality of operation units in one machine learning unit shares one sending interface in the first transmission interface, and each operation unit corresponds to one data receiving interface, which may further reduce the count of sending interfaces of data operation signals in the machine learning unit, save hardware resources, and reduce hardware area and power consumption.

Figure 5:
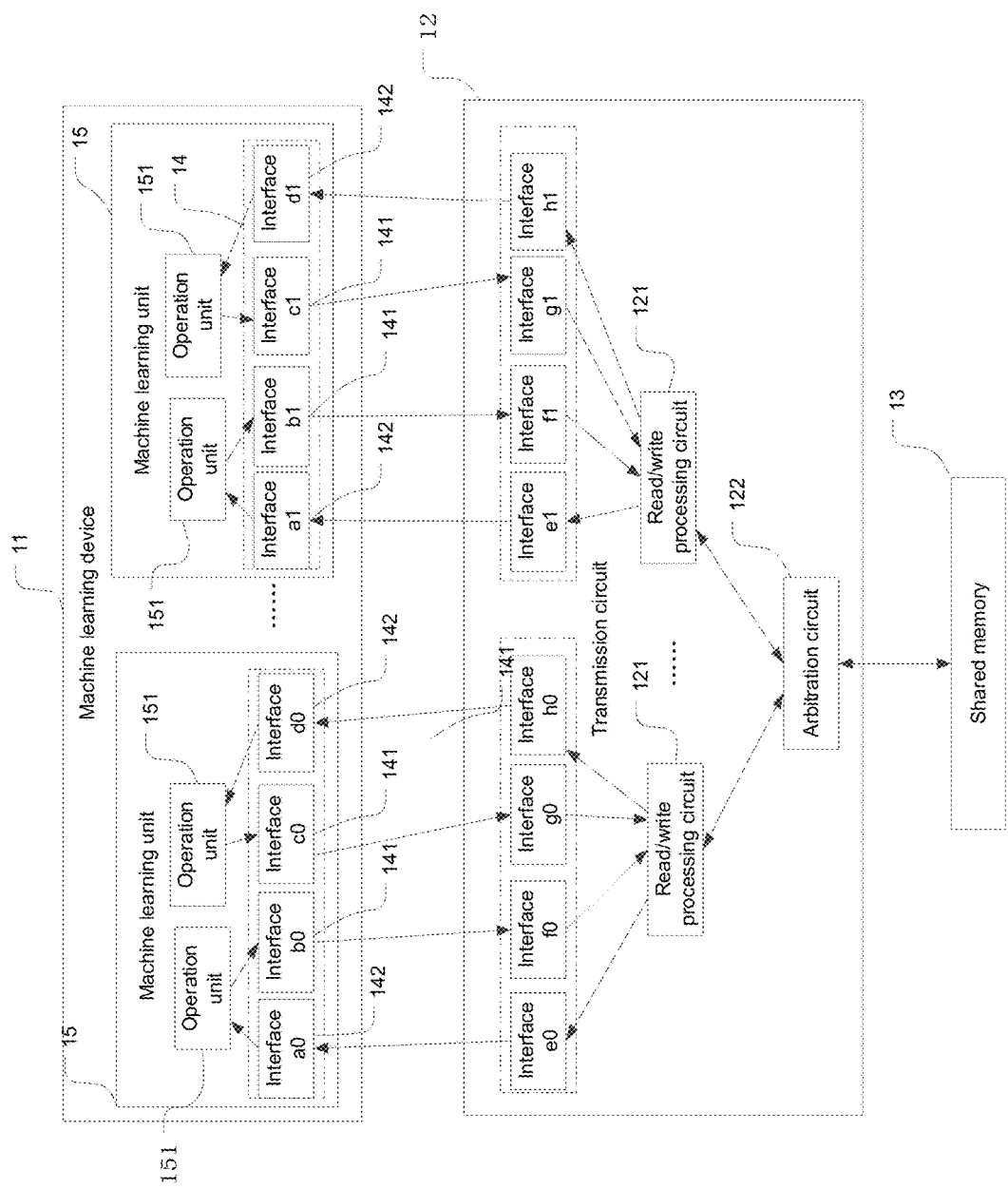
FIG. 5 is a schematic structural diagram of a data processing device according to an embodiment.

In an embodiment, as shown in FIG. 5, the plurality of operation units 151 in one machine learning unit 15 respectively correspond to one sending interface 141 and one data receiving interface 142 in the first transmission interface.

As shown in FIG. 5, an operation unit 151 may correspond to a sending interface 141 and a data reception interface 142. The operation unit 151 sends a data operation signal to the transmission circuit 12 through a corresponding sending interface 141, and the transmission circuit 12 returns obtained input neuron data and weight data to a target operation unit 151 through a corresponding data receiving interface 142. For example, an operation unit 1 corresponds to a sending interface 1 and a data receiving interface 1, and an operation unit 2 corresponds to a sending interface 2 and a data receiving interface 2; the operation unit 1 sends a data operation signal to the transmission circuit 12 through the sending interface 1, and the transmission circuit 12 determines target operation units to be the operation unit 1 and the operation unit 2 according to the data operation signal, then the transmission circuit returns obtained input neuron data and weight data to the operation unit 1 and the operation unit 2 through a data receiving interface 1 and a data receiving interface 2.

Therefore, in the data processing device shown in this embodiment, each of a plurality of operation units in one machine learning unit respectively corresponds to one sending interface and one data receiving interface in the first transmission interface. The one-to-one correspondence of the plurality of operation units, the sending interfaces and the data receiving interfaces in the first transmission interface may effectively simply the control logic in the process of data transfer.

Figure 6:
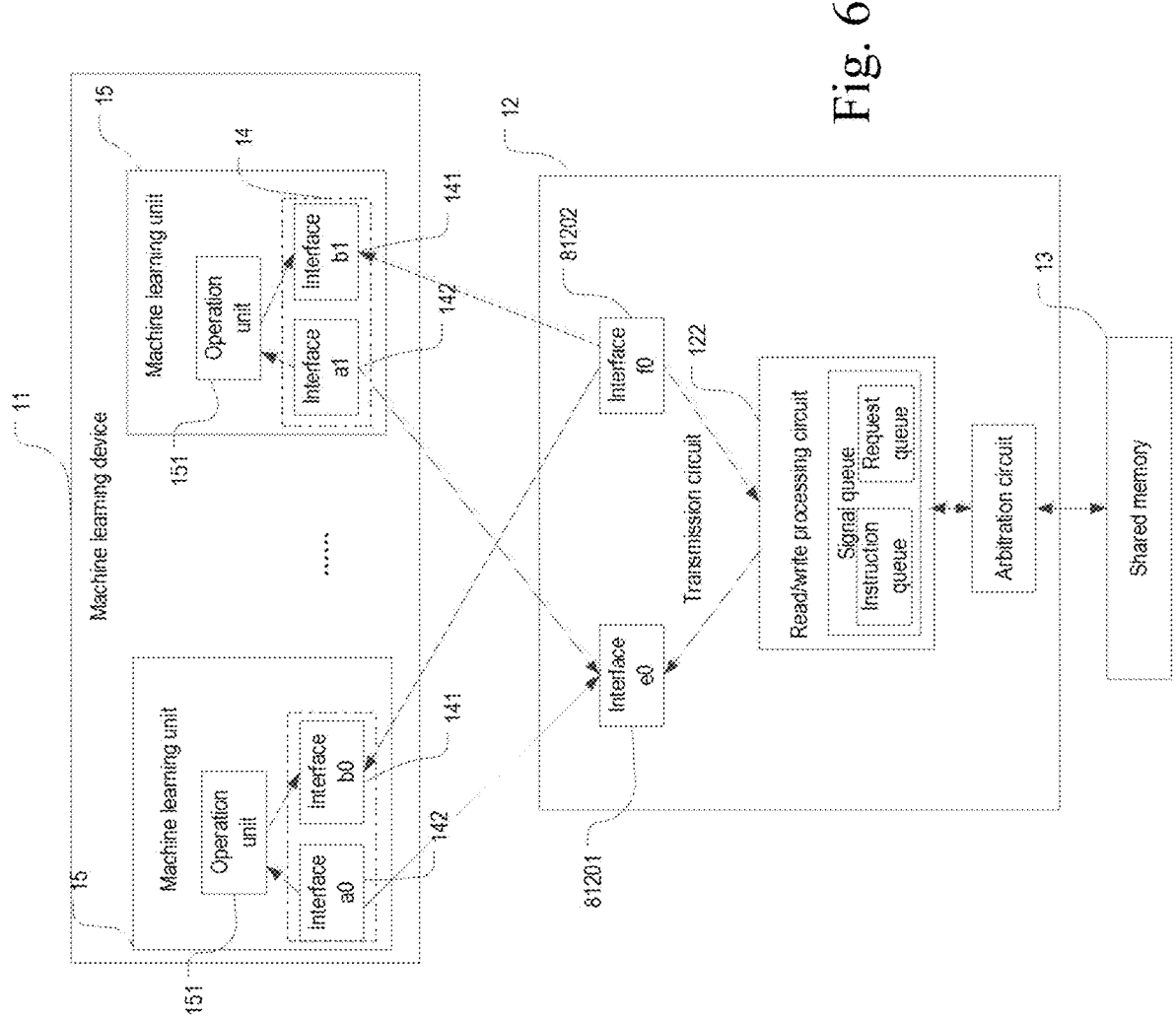
FIG. 6 is a schematic structural diagram of a data processing device according to an embodiment.

In an embodiment, as shown in FIG. 6, a plurality of machine learning units 15 share a signal receiving interface 1201 and a data return interface 1202 in the second transmission interface 120.

The plurality of machine learning units 15 share a signal receiving interface 1201 and a data return interface 1202 in the second transmission interface 120. For example, if the read/write processing circuit 121 is a broadcast read processing circuit, a plurality of machine learning units send data operation signals to the broadcast read processing circuit through the signal receiving interface 1201, and the broadcast read processing circuit obtains input neuron data and weight data according to the data operation signals, and return the input neuron data and weight data to a target machine learning unit through the data return interface 1202 according to address information in the data operation signals.

The data processing device in this embodiment, the plurality of machine learning units share a signal receiving interface and a data return interface in the second transmission interface. In this embodiment, the data processing device shares a signal receiving interface and a data return interface in the second transmission interface, which further reduces hardware overhead and avoid hardware redundancy.

In an embodiment, as shown in FIG. 6, the read/write processing circuit 121 further includes a signal queue configured to store data operation signals sent by each machine learning unit 15; the read/write processing circuit 121 is further configured to determine whether there is remaining space in the signal queue when receiving the data operation signals received; if there is remaining space 121, the read/write processing circuit is configured to cache the data operation signals in the signal queue; otherwise the read/write processing circuit is configured to block the data operation signals.

The signal queue may be configured to store data operation signals sent by each machine learning unit 15, and the queue may be arranged outside or inside the read/write processing circuit 121. When the read/write processing circuit 121 receives a data operation signal, the circuit may obtain a storage space of the signal queue by sending a memory query instruction to the signal queue. If the storage space of the signal queue can store the data operation signal, the data operation signal is cached to the signal queue; if the storage space of the signal queue cannot store the data operation signal, the data operation signal is blocked.

The data processing device shown in this embodiment, the read/write processing circuit further includes a signal queue configured to store data operation signals sent by each machine learning unit; the read/write processing circuit is further configured to determine whether there is remaining space in the signal queue when receiving the data operation signals received; if there is remaining space, the read/write processing circuit is configured to cache the data operation signals in the signal queue; otherwise the read/write processing circuit is configured to block the data operation signals. In this embodiment, when the read/write processing circuit receives a plurality of data operation signals, the circuit may cache the data operation signals to the signal queue or block the data operation signals, so that the data operation signals can be sent to the arbitration circuit one by one for processing, which avoids blockage of data operations signals, In this way, a plurality of machine learning units can perform a data operation on the shared memory through one transmission circuit, which reduces hardware overhead and avoids hardware redundancy.

Optionally, if the read/write processing circuit 121 is a broadcast processing circuit, the signal queue includes an instruction queue and a request queue. The instruction queue is configured to cache instruction-type signals received by the broadcast processing circuit; and the request queue is used to cache request-type signals obtained after parsing the instruction-type signals.

If the read/write processing circuit 121 is a broadcast processing circuit, the signal queue may include an instruction queue and a request queue. The circuit may store received instruction-type signals sent by each machine learning unit 15 in the instruction queue, and parse instruction-type signals through the broadcast processing circuit to obtain request-type signals and store obtained request-type signals in the request queue. The instruction queue is configured to cache instruction-type signals received by the broadcast processing circuit; and the request queue is used to cache request-type signals obtained after parsing the instruction-type signals.

Regarding the data processing device shown in this embodiment, when the read/write processing circuit is a broadcast processing circuit, the signal queue includes an instruction queue and a request queue. The instruction queue is configured to cache instruction-type signals received by the broadcast processing circuit; and the request queue is used to cache request-type signals obtained after parsing the instruction-type signals. In this embodiment, by respectively storing instruction-type signals and request-type signals in the instruction queue and the request queue, the instruction-type signals and the request-type signals can be sent to the arbitration circuit one by one for processing, which avoids blockage of data operations signals, In this way, a plurality of machine learning units can perform a data operation on the shared memory through one transmission circuit, which reduces hardware overhead and avoids hardware redundancy.

The present disclosure further provides a neural network operation device which includes one or more computation devices mentioned in the present disclosure. The neural network operation device is configured to obtain data to be operated and control information from other processing devices, perform a specified neural network operation, and send an execution result to a peripheral apparatus through an I/O interface. The peripheral apparatus may include a camera, a monitor, a mouse, a keyboard, a network card, a WIFI interface, a server, and the like. When more than one of the above computation devices are included, the computation devices may be interconnected and transfer data to each other through a specific structure. For example, the computation devices may be interconnected and transfer data via a PCIE bus to support neural network operations with a larger scale. In this case, the computation devices may share the same control system, or may have separate control systems. The computation devices may share a memory, or each accelerator may have separate memories. In addition, an interconnection method of the computation devices may be any interconnection topology.

The neural network operation device has good compatibility and may be connected to various types of servers through a PCIE interface.

Figure 7:
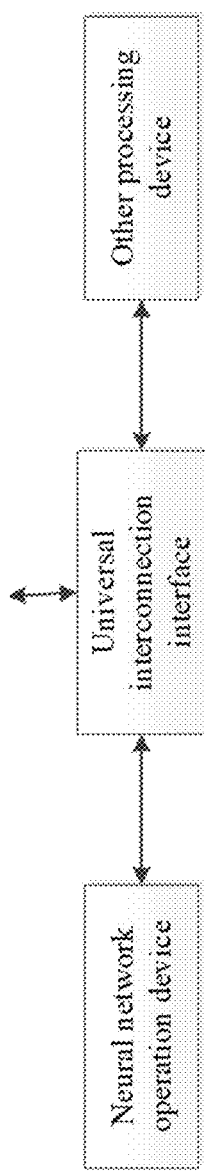
FIG. 7 is a schematic structural diagram of a combined processing device according to an embodiment.

The present disclosure also provides a combined processing device, where the device includes the neural network operation device, a universal interconnection interface, and other processing devices. The neural network operation device interacts with other processing devices to perform operations specified by users. FIG. 7 is a schematic diagram of the combined processing device.

The other processing devices include at least one or more of a general-purpose/special-purpose processors such as a central processing unit (CPU), a graphics processing unit (GPU), a neural network processor, and the like. A count of processors included in the other processing devices is not limited herein. The other processing devices may serve as an interface that connects the neural network operation device to external data and control, including data moving, and may perform the basic control such as starting and stopping the neural network operation device. The other processing devices may also cooperate with the neural network operation device to complete operation tasks.

The universal interconnection interface may be configured to transfer data and control instructions between the neural network operation device and the other processing devices. The neural network operation device may obtain required input data from the other processing devices and write the data in an on-chip storage device of the neural network operation device. The neural network operation device may obtain control instructions from the other processing device, and write the control instructions in an on-chip control cache of the neural network operation device. The neural network operation device may further read data stored in a storage module of the neural network operation device and transfer the data to the other processing devices.

Figure 8:
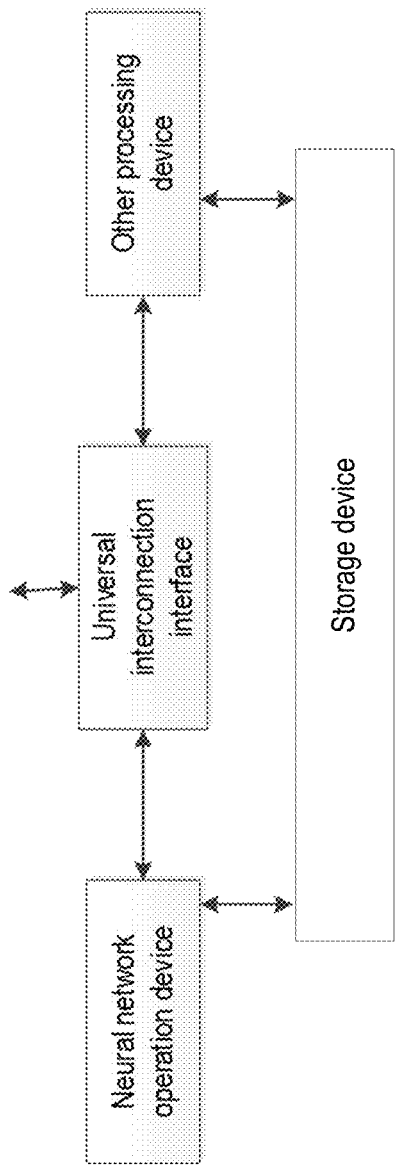
FIG. 8 is a schematic structural diagram of a combined processing device according to another embodiment.

Optionally, as shown in FIG. 8, the structure may further include a storage device, where the storage device is connected to the neural network operation device and the other processing devices respectively, and the storage device is configured to store data of the neural network computation device and the other processing devices. The storage device is configured to store data of the neural network operation device and the other processing devices, and is particularly suitable for a case where data to be operated cannot be completely stored in an internal memory of the neural network operation device or the other processing devices.

The combined processing device may be used as an SOC (System on Chip) of a device such as a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The components may include a camera, a monitor, a mouse, a keyboard, a network card, and a WIFI interface.

In some embodiments, the present disclosure provides a chip which includes the above neural network computation device or the combined processing device.

In some embodiments, the present disclosure provides a chip package structure which includes the above chip.

Figure 9:
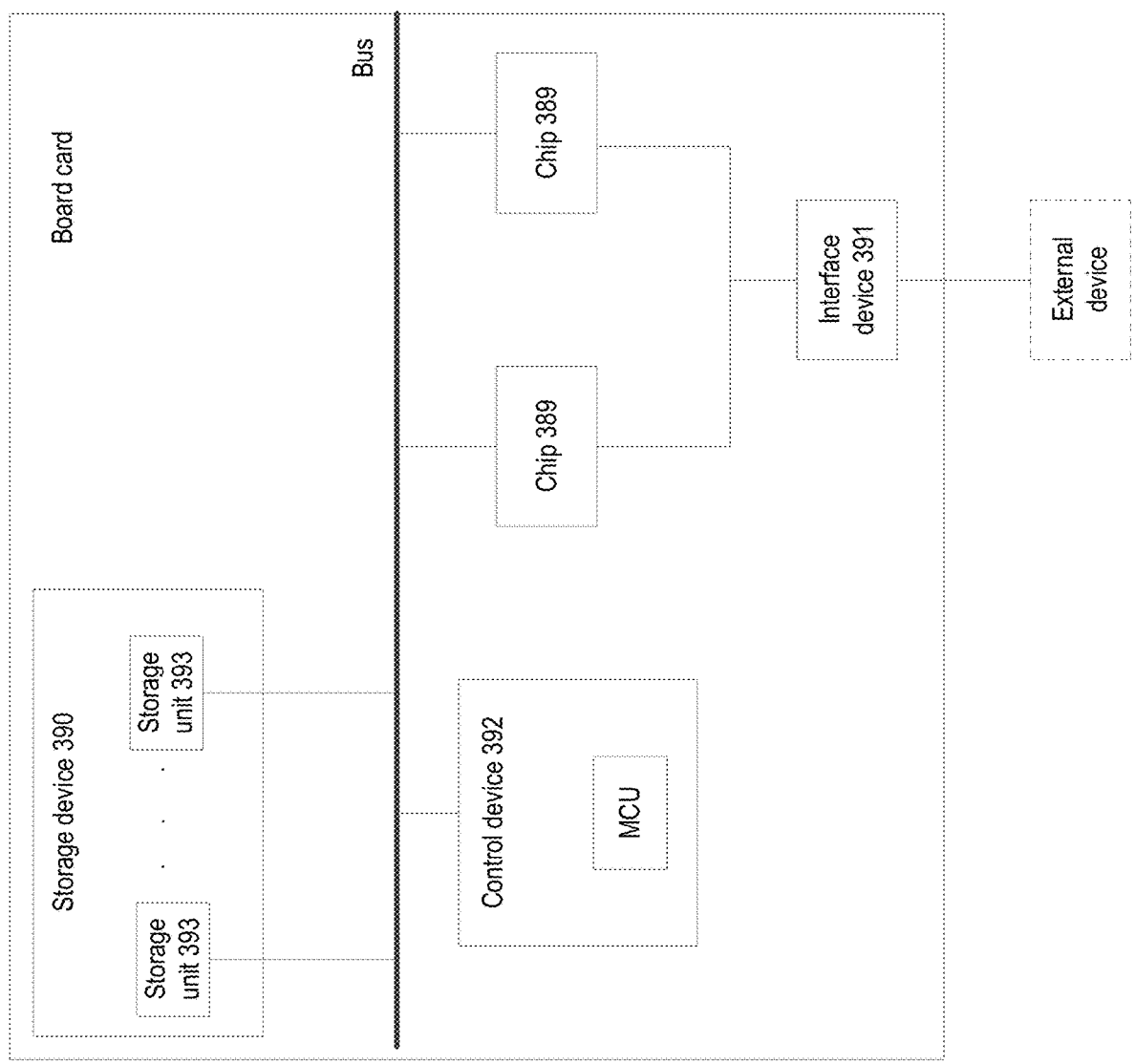
FIG. 9 is a schematic structural diagram of a board card according to an embodiment.

In some embodiments, the present disclosure provides a board card which includes the above chip package structure. FIG. 9 shows a board card which includes the above chip 389 and other supporting components, where the supporting components include and are not limited to: a storage device 390, an interface device 391, and a control device 392;

the storage device 390 is connected to the chip in the chip package structure through a bus for storing data. The storage device may include a plurality of clusters of storage units 393. Each cluster of the storage units is connected to the chip through a bus. It may be understood that each cluster of the storage units may be DDR SDRAMs (Double Data Rate Synchronous Dynamic Random Access Memory).

DDR may double the speed of SDRAM without increasing a clock frequency. DDR allows data to be read on rising and falling edges of a clock pulse. A speed of DDR is twice that of standard SDRAM. In an embodiment, the storage device may include four clusters of the storage units. Each cluster of the storage units may include a plurality of DDR4 particles (chips). In an embodiment, the chip may include four 72-bit DDR4 controllers, where 64 bits in the 72-bit DDR4 controller are used for data transfer and 8 bits are used for ECC verification. It may be understood that when DDR4-31200 particles are used in each cluster of the storage units, a theoretical bandwidth of data transfer may reach 251600 MB/s.

In an embodiment, each cluster of the storage units includes a plurality of DDR SDRAMs arranged in parallel. DDR may transfer data twice in one clock cycle. A controller for controlling the DDR is arranged in the chip to control data transfer and data storage of each storage unit.

The interface device is electrically connected to the chip in the chip package structure. The interface device is configured to implement data transfer between the chip and an external device (such as a server or a computer). For example, in an embodiment, the interface device may be a standard PCIE interface. For example, data to be processed is transferred from the server to the chip through a standard PCIE interface to realize data transfer. Optionally, when a PCIE 3.0×16 interface is used for transfer, a theoretical bandwidth may reach 116000 MB/s. In another embodiment, the interface device may also be other interfaces. A specific representation of the other interfaces is not limited herein, as long as the interface unit can realize a switching function. In addition, a computation result of the chip is still sent back to the external device (such as a server) by the interface device.

The control device is electronically connected to the chip. The control device is configured to monitor a state of the chip. Specifically, the chip and the control device may be electrically connected through an SPI interface. The control device may include a micro controller unit (MCU). For example, the chip may include a plurality of processing chips, processing cores, or processing circuits, and may drive a plurality of loads. Therefore, the chip can be in different working states such as multi-load and light-load. The control device may realize regulation and control of working states of a plurality of processing chips, processing cores and/or processing circuits in the chip.

In some embodiments, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

It should be understood that identical or similar parts in the above embodiments may be referred to each other, and for contents not described in detail in some embodiments, please refer to the identical or similar contents in other embodiments.

It should be noted that in the descriptions of the present disclosure, the terms "first", "second", etc., are only used for descriptive purposes, and should not be understood as indicating or implying relative importance. In addition, in the description of the present disclosure, unless otherwise specified, the word "plurality" means "at least two".

It should be understood that any process or method description in the flowchart or described in other ways herein represents one or more modules, segments, or parts of codes of executable instructions configured to implement specific logical functions or steps of the process. In addition, the scope of optional implementations of the present disclosure includes additional implementations, and the functions can be implemented in an order not shown or discussed in the present disclosure, or in a substantially simultaneous manner, or in a reverse order according to the functions involved, which should be understood by those skilled in the art to which the embodiments of this present disclosure belong.

It should be understood that each part of the present disclosure can be implemented by hardware, software, firmware, or a combination thereof. In the above implementations, a plurality of steps or methods can be implemented by using software or firmware stored in a memory and executed by a suitable instruction execution system. For example, if hardware is used for implementation, as in another implementation, the steps can be implemented by any one or more of the following technologies known in the art: a discrete logic circuit with a logic gate circuit configured to implement logic functions on data signals, an application-specific integrated circuit with a suitable combinational logic gate circuit, a programmable gate array (PGA), a field-programmable gate array (FPGA), and the like.

Those of ordinary skill in the art can understand that the entire or part of the flow in the methods as stated in the embodiments can be implemented by a program instructing related hardware, wherein the program may be stored in a computer readable storage medium and may include one or more of the methods as stated in the embodiments during execution.

In addition, the functional units in each example of the present application may be integrated into one processing module, or each of the units may exist separately and physically, or two or more units may be integrated into one module. The integrated module above may be implemented in the form of hardware or software function module. When the integrated module is implemented in the form of a software function module and sold or used as an independent product, the module may be stored in a computer-readable storage medium.

The storage medium may be a read-only memory, a disk, a compact disc, etc.

The term "an embodiment", "some embodiments", "example", "specific example", "some examples", or the like referred to herein means that particular features, structures, materials, or characteristics described in conjunction with the embodiment or the example may be contained in at least one embodiment or example of the present disclosure. In the specification, the schematic descriptions of the above terms do not necessarily refer to the same embodiment or example. In addition, the described specific features, structures, materials, or characteristics can be combined in any one or more embodiments or examples in a suitable manner.

Although embodiments of the present disclosure have been shown and described above, it should be understood that the above embodiments are only exemplary and not intended to limit the disclosure. Any changes, modifications, replacements, and variants of the embodiments can be made within the scope of the disclosure.

The invention claimed is:

1. A hardware data processing circuit configured to process machine learning data, wherein the data processing circuit includes a machine learning device, a transmission circuit, and a shared memory, and the transmission circuit includes a plurality of read/write processing circuits and an arbitration circuit, the machine learning device includes a plurality of machine learning units, wherein each of the machine learning units includes at least one operation unit, the plurality of machine learning units are connected to the transmission circuit through a first transmission interface, the transmission circuit is connected to the shared memory;

the arbitration circuit is configured to arbitrate data operation signals sent by the plurality of machine learning units, and obtain input data required by the machine learning device from the shared memory according to data operation signals that have been successfully arbitrated; and the read/write processing circuit is configured to determine a target machine learning unit or a target operation unit from the plurality of machine learning units according to address information carried by the data operation signals that have been successfully arbitrated or types of the data operation signals, and return the input data to the target machine learning unit or the target operation unit, wherein the read/write processing circuit includes at least one of following processing circuits: a unicast read processing circuit, and a broadcast processing circuit; the data operation signal includes at least one of a unicast read request, a unicast write request, a multicast instruction, and a broadcast instruction, where a unicast-type processing circuit is configured to process a unicast-type signal, and a broadcast-type processing circuit is configured to process a multicast-type or broadcast-type signal.

2. The hardware data processing circuit of claim 1, wherein the machine learning device is configured to perform a machine learning operation according to the input data to obtain output data.

3. The hardware data processing circuit of claim 2, wherein the machine learning device is further configured to transfer the output data to the shared memory through the transmission circuit for data storage.

4. The hardware data processing circuit of claim 1, wherein the arbitration circuit is configured to determine priorities of data operation signals sent by a plurality of read/write processing circuits, and use a data operation signal with a highest priority as a data operation signal that has been successfully arbitrated.

5. The hardware data processing circuit of claim 1, wherein the arbitration circuit is configured to, when priorities of the data operation signals sent by the plurality of read/write processing circuits are identical, determine a data operation signal that has been successfully arbitrated according to types of the plurality of data operation signals and a preset execution condition.

6. The hardware data processing circuit of claim 5, wherein if the data operation signal is a unicast-type signal, the execution condition includes: a channel of a machine learning unit that sends the unicast-type signal is idle, or a channel of an operation unit in the machine learning unit that sends the unicast-type signal is idle.

7. The hardware data processing circuit of claim 5, wherein if the data operation signal is a multicast-type signal, the execution condition includes: a channel of a machine learning unit that sends the multicast-type signal is idle, and a channel of a target machine learning unit specified by the multicast-type signal is idle; or, a channel of an operation unit in the machine learning unit that sends the multicast-type signal is idle, and a channel of a target operation unit specified by the multicast-type signal is idle.

8. The hardware data processing circuit of claim 5, if the data operation signal is a broadcast-type signal, the execution condition includes: a channel of a machine learning unit that sends the broadcast-type signal is idle, and channels of other remaining machine learning units are idle; or, a channel of an operation unit in the machine learning unit that sends the broadcast-type signal is idle, and channels of operation units in other remaining machine learning units are idle.

9. The hardware data processing circuit of claim 8, wherein the transmission circuit further includes a second transmission interface, where each interface in the second transmission interface is connected to each interface in the first transmission interface in a one-to-one correspondence, and one machine learning unit is correspondingly connected to one read/write processing circuit.

10. The hardware data processing circuit of claim 9, wherein a plurality of operation units in one machine learning unit share a same sending interface in the first transmission interface, and each operation unit corresponds to one data receiving interface.

11. The hardware data processing circuit of claim 9, wherein each of the plurality of operation units in one machine learning unit respectively corresponds to one sending interface and one data receiving interface in the first transmission interface.

12. The hardware data processing circuit of claim 8, wherein the transmission circuit further includes a second transmission interface, and the plurality of machine learning units share a signal receiving interface and a data return interface in the second transmission interface.

13. The hardware data processing circuit of claim 8, wherein the read/write processing circuit further includes a signal queue, where the signal queue is used to store data operation signals sent by each machine learning unit; and the read/write processing circuit is further configured to determine whether there is remaining space in the request queue when receiving the data operation signals; if there is remaining space, the read/write processing circuit is configured to cache the data operation signals in the request queue; if there is no remaining space, the read/write processing circuit is configured to block the data operation signals.

14. The hardware data processing circuit of claim 13, wherein if the read/write processing circuit is a broadcast processing circuit, the signal queue includes an instruction queue and a request queue, where the instruction queue is used to cache instruction-type signals received by the broadcast processing circuit; and the request queue is used to cache request-type signals obtained after parsing the instruction-type signals.

15. The hardware data processing circuit of claim 8, wherein the machine learning unit further includes: a controller unit connected to the operation unit; the operation unit includes a primary processing circuit and a plurality of secondary processing circuits, and the operation unit is connected to the transmission circuit through the first transmission circuit;

the controller unit is configured to send the data operation signal and the output data to the transmission circuit through the transmission interface in the first transmission interface, receive the input data obtained from the shared memory through the receiving interface in the first transmission interface, and send the input data to the primary processing circuit and/or the secondary processing circuits;

the primary processing circuit is configured to distribute the input data to the plurality of secondary processing circuits; the plurality of secondary processing circuits are configured to perform intermediate operations in parallel according to the input data transferred by the primary processing circuit to obtain a plurality of intermediate results, and transfer the plurality of intermediate results to the primary processing circuit; and the primary processing circuit is further configured to perform subsequent processing on the plurality of intermediate results to obtain a computation result.

16. The hardware data processing circuit of claim 1, wherein the input data includes input neuron data and/or weight data, and the output data includes output neuron data.

* * * * *